United States Patent [19]

Baba

[11] Patent Number: 4,736,337

[45] Date of Patent: Apr. 5, 1988

[54] MONOLITHIC INTEGRATED CIRCUIT HAVING COMMON EXTERNAL TERMINAL FOR ANALOG AND DIGITAL SIGNALS AND DIGITAL SYSTEM USING THE SAME

[75] Inventor: Shirou Baba, Tachikawa, Japan

[73] Assignee: Hitachi, Ltd., Tokyo, Japan

[21] Appl. No.: 862,641

[22] Filed: May 13, 1986

Related U.S. Application Data

[60] Division of Ser. No. 587,524, Mar. 8, 1984, Pat. No. 4,630,207, which is a continuation of Ser. No. 213,923, Feb. 5, 1981, Pat. No. 4,451,891.

[30] Foreign Application Priority Data

Feb. 20, 1980 [JP] Japan .................................. 55-18986

[51] Int. Cl.$^4$ ...................... G05B 11/01; G06F 15/00
[52] U.S. Cl. ................................. 364/900; 364/431.12
[58] Field of Search ... 364/135, 180, 600, 200 MS File, 364/900 MS File, 712, 431.12, 513.5, 514; 340/347 M, 347 C

[56] References Cited

U.S. PATENT DOCUMENTS 4,118,772 10/1978 Takada ........................... 364/200 X
4,451,891 5/1984 Baba .................................. 364/900 X
4,630,207 12/1986 Baba .................................. 364/900 X

OTHER PUBLICATIONS

"TMS 2100 Tentative Specifications," published by Texas Instruments, Apr. 11, 1979.

*Primary Examiner*—Gareth D. Shaw
*Assistant Examiner*—Paul Kulik
*Attorney, Agent, or Firm*—Antonelli, Terry & Wands

[57] ABSTRACT

Herein disclosed is a digital semiconductor integrated circuit which is equipped with: a digital signal input circuit; an analog signal input circuit made receptive of an analog signal for feeing out a digital signal corresponding to said analog signal; and a common external terminal connected commonly with the input terminals of said digital signal input circuit and said analog signal input circuit. By the preparation with the use of a suitable switch circuit, the aforementioned common external terminal can be used as either an analog signal input terminal or a digital signal input terminal. As a result, the number of the external output terminals required for the aforementioned semiconductor integrated circuit can be reduced.

26 Claims, 3 Drawing Sheets

MONOLITHIC INTEGRATED CIRCUIT HAVING COMMON EXTERNAL TERMINAL FOR ANALOG AND DIGITAL SIGNALS AND DIGITAL SYSTEM USING THE SAME

This is a division of U.S. Ser. No. 587,524, filed Mar. 8, 1984; now U.S. Pat. No. 4,630,207 which is a continuation of U.S. Ser. No. 213,923, filed Feb. 5, 1981 now U.S. Pat. No. 4,451,891.

BACKGROUND OF THE INVENTION

The present invention relates to a monolithic integrated circuit containing an analog to digital converter (which will be shortly referred to as the "A/D converter") for forming at least a part of a digital control system.

A digital control system can have its size reduced by using a semiconductor integrated circuit. Moreover, the digital control system can be made to exhibit a relatively high reliability by being enabled to reduce the number of the external wires of the semiconductor integrated circuit.

In order to make a system control of high quality possible, a control system such as a process control system (making use of a microprocessor) or a computing control system is made receptive of not only the signals of various kinds of sensors (which will be referred to as the "digital sensors") made operative of digital or pulse signals but also analog signals bearing much information through the A/D converter.

In this case, both an input circuit (i.e., a digital input circuit) for feeding from the data signal from a digital sensor to the data bus of a microprocessor and an input circuit (i.e., an analog input circuit) for feeding the data signal from an analog sensor to the aforementioned data bus after it has been converted into a digital signal are desired to be constructed of a one-chip monolithic semiconductor integrated circuit (which will be shortly referred to as the "monolithic IC" or "IC") in order partly to reduce the size of a device constructing the system and partly to reduce the number of the external wirings of that device, as has been described in the above.

Moreover, the aforementioned monolithic IC is desired to be so constructd that it can be applied to a variety of control systems.

By affording the general usability of the aforementioned monolithic IC, this monolithic IC can be used in a variety of different control systems so that the maintenance of the various control systems can be facilitated. Moreover, the change and development of the control systems can also be facilitated.

In the usual monolithic IC, however, it should be noted that the number of the external terminals to be attached to the package thereof is limited by the size of that package, for example.

In case the number of the external terminals to be attached to the IC package is limited so that the numbers of both analog and digital input terminals are accordingly limited, the monolithic IC has its applicability limited to a restricted control system.

For instance, the monolithic IC, which has its digital input terminals relatively reduced by the provision of a relatively great number of the analog input terminals, is difficult to use in a control system having a relatively great number of digital input signals. On the contrary, the monolithic IC, which has its analog input terminals relatively reduced by the provision of a relatively great number of the digital input terminals, is difficult to use in the control system which is fed with a relatively great number of analog input signals.

The monolithic IC having the construction thus far described makes it difficult to change the control systems.

For examples, the output data signal from the analog sensor has its level made proportional to the physical quantity to be detected so that it can bear more information than that output data signal from the digital sensor, which is made to correspond to whether the physical quantity to be detected exceeds a certain threshold level or not. Therefore, the control system developed in advance can be easily changed, if the digital sensor can be replaced by the analog sensor, into such a control system as can perform a system control of higher quality. However, in case the monolithic IC having its digital input terminals relatively increased is used, the aforementioned system change becomes difficult because the analog input terminals are relatively reduced.

In case the monolithic IC is to be equipped with the number of analog and digital input terminals required, the size of its package has to be enlarged because of the increase in the number of external terminals.

SUMMARY OF THE INVENTION

It is, therefore, an object of the present invention to provide a semiconductor integrated circuit which forms at least a part of a digital control system and which exhibits high general usability even with a relatively small number of external terminals.

Another object of the present invention is to provide a semiconductor integrated circuit which can further reduce the number of its external terminals.

A further object of the present invention is to provide a digital control system using the semiconductor integrated circuit of the aforementioned type.

Other objects of the present invention will become apparent from the following description taken in conjunction with the accompanying drawings.

According to the present invention, the semiconductor integrated circuit is equipped with signal receiving common external terminals which can receive both analog input signals and digital input signals. The aforementioned common external terminals are used as either the external terminals for receiving the digital signals or the external terminals for receiving the analog signals in accordance with the control by such a program as operates the control system.

In accordance with the present invention, moreover, the semiconductor integrated circuit is further equipped, if necessary, with such common external termianls as can partly receive digital input signals and partly generate digital output signals.

DESCRIPTION OF THE PREFERRED EMBODIMENTS

The present invention will be described in detail in the following in connection with the embodiments thereof.

Figure 1:
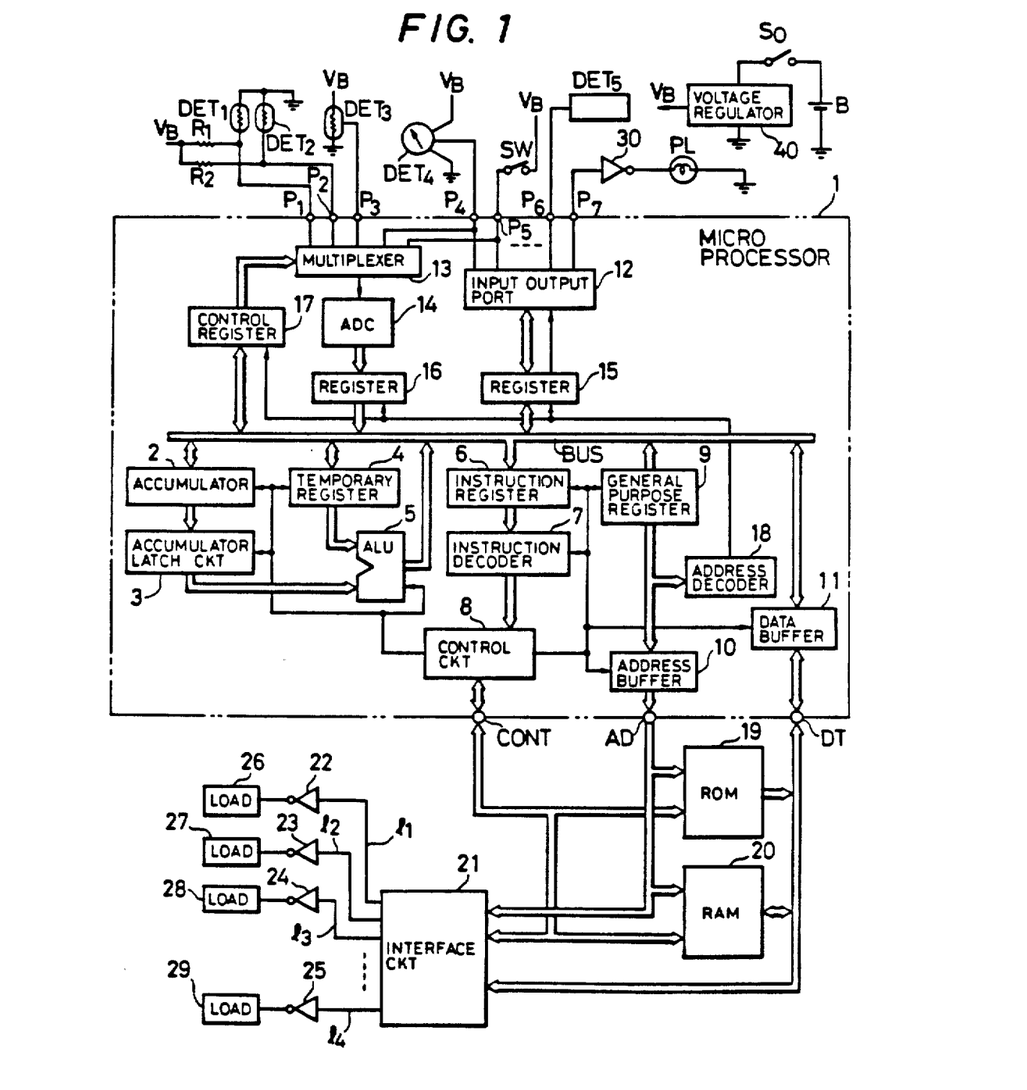
FIG. 1 is a block diagram showing the circuit of one embodiment of the present invention.

FIG. 1 is a block diagram showing one embodiment of the present invention.

Generally indicated at reference numeral 1 is a microprocessor which is constructed into a one-chip monolithic semiconductor integrated circuit composed of such respective circuit blocks 2 to 18 as will be described in the following.

Indicated at numeral 2 is an accumulator which has its data input and output terminals coupled to an internal data bus line BUS. Indicated at numeral 3 is an accumulator latching circuit which is coupled to the aforementioned accumulator 2. Indicated at numeral 4 is a temporary register which has its data input and output terminals coupled to the aforementioned internal data bus line BUS. Indicated at numeral 5 is an arithmetic and logic unit which is made receptive to the output data of the aforementioned accumulator latch circuit 3 and the temporary register 4 as its operand. The circuits 2 to 5 thus far described construct together an arithmetic unit and have their respective operations controlled by the control signals which are generated by a timing control circuit 8.

The aforementioned arithmetic and logic unit 5 has its operation so controlled by the output signal of the timing control circuit 8 as to perform an arithmetic operation such as addition or subtraction or an OR, AND, exclusive or logical operation.

The output data of the aforementioned arithmetic and logic unit 5 are different in accordance with the control signal, which is generated by the timing control circuit 8, but are fed out to the accumulator 2 through the internal data bus line BUS, for example.

Numerals 6 and 7 indicate an instruction register and an instruction decoder and machine cycle encoder, respectively. The circuits 6 to 8 thus far described construct together a control unit.

The aforementioned instruction register 6 is provided to receive the instruction which is fed to the internal data bus line BUS through an external data bus line DT and a data buffer 11 from such as ROM (i.e., a read only memory) 19 as is disposed at the outside of the microprocessor 1.

The instruction, which is received by the aforementioned instruction register 6, is fed to the aforementioned circuit 7 so that it is decoded by the instruction decoder in that circuit 7. The resultant output of the aforementioned instruction decoder is fed to the machine cycle encoder in the aforementioned circuit 7. The aforementioned machine cycle encoder generates a variety of timing signals which are determined by the output signal of the aforementioned instruction decoder.

The aforementioned timing control circuit 8 has its operational timing controlled by the clock signals fed from grouped external control terminals CONT so that it generates both a bus control signal for receiving the data fed from the external data bus line DT and a strobe signal for writing out the data to the external data bus line DT.

Moreover, the aforementioned timing control circuit 8 examines a series of signals such as an interrupt signal fed from the grouped external control terminals, CONT a hold signal for holding the operations of the system and a reset signal so that it feeds out a series of signals such as a flag signal indicating the reception of the interruption or a flag signal indicating the reception of the requirement for the hold through the aforementioned grouped external control terminals in response to those signals examined.

Indicated at numeral 9 is a register group which is composed, although not shown, of general purpose registers, a stack pointer and a program counter.

The general purpose registers of the aforementioned register group 9 are used for memory operation in addition for handling data (including double length data). The stack pointer is used to memorize the return address of a subroutine jump. The program counter is a register for memorizing the address of the instruction to be subsequently read out, and its data are increased one by one each time one instruction is executed except for that the instruction to be fed to the instruction register 6 is the jump instruction.

Indicated at numeral 18 is an address decoder which is made responsive to the output of the general purpose register of the register group 9 thereby to generate a signal for controlling later-described circuits 15 to 17. Incidentally, the circuit 15 to 17 can be controlled by the general purpose registers of the register group 9. However, by using the address decoder circuit 18, as show, the aforementioned circuits 15 to 17 can also be controlled even with the use of a small number of the general purpose registers.

Indicated at numeral 10 is an address buffer which is made receptive to the output signals from the register group 9 thereby to generate an address signal to be fed to the ROM 19, an RAM 20 and an interface circuit 21.

Indicated at numeral 11 is a data buffer which effects interchanges of the data between the external data bus line DT and the internal data bus line BUS.

In the embodiment being described, the external terminals $P_1$ to $P_3$ of the microprocessor 1 are used as the input terminals for exclusively receiving the analog signals, and the external terminals $P_6$ and $P_7$ are used as the input and output terminals for exclusively feeding and receiving the digital signals. On the other hand, the external terminals $P_4$ and $P_5$ are used as common terminals for the input of the analog signals and for the input and output of the digital signals.

In the present embodiment, although not limited thereto, the aforementioned external terminal $P_4$ is fed with the analog signals which are generated by an analog sensor $DET_4$, and the aforementioned external terminal $P_5$ is fed with the digital signals which are generated by a switch SW. The aforementioned external terminal $P_6$ is fed with the digital signals which are generated by a digital sensor $DET_5$. The aforementioned external terminal $P_7$ is fed with the digital signals which are used to drive a lamp PL.

Indicated at numeral 12 is a digital input output port which is connected between the aforementioned external terminals $P_4$ to $P_7$ and the register 15.

Whether the aforementioned respective external terminals $P_4$ to $P_7$ are used as the digital input terminals or the digital output terminals or not is determined by the control data which are set in the aforementioned register 15.

The aforementioned control data to be fed to the aforementioned register 15 are fed out of the ROM 19 together with the instruction. The input timing of the aforementioned control data is controlled by the control signal which is fed out of the address buffer 10 in accordance with the execution of the program written in the ROM 19.

The aforementioned register 15 is set with both the digital input data, which are fed through the aforementioned input output port 12, and the digital output data which are fed from the aforementioned internal data bus line BUS until it is to be fed to the external terminals $P_4$ to $P_7$.

The digital input data, which are set in the aforementioned register 15, are written in the RAM 20 through the internal data bus line BUS and the data buffer 11.

The setting operation of the control data in the aforementioned register 15, the setting operation of the digital output data, and the reading operation of the digital input data, which are set in the aforementioned register 15, are under the control of the program which is written in advance in the ROM 19.

For example, at the timing of writting the digital input data, which are fed to the external terminal $P_5$, into the RAM 20, there is fed out of the address decoder 18 the control signal for transferring the set data of the aforementioned register 15, which is set to have a value corresponding to the digital input data fed to the aforementioned external terminal $P_5$, to the internal data bus line BUS.

Likewise, at the time of writing the digital input data, which are fed to the external terminal $P_6$, into the RAM 20, a control signal similar to the signal for transferring input data from register 15 to the internal bus line BUS is fed out of the address decoder 18.

The program for writing the digital input data, which are fed from an element such as the starter switch of an automotive engine, into the RAM 20, is executed for a predetermined time period at the start of the engine. Furthermore, the program for writing the digital input data, which for example are fed from the crank angle sensor of the engine, into the RAM 20 is executed once for a relatively short period of several milliseconds.

In order to use the external terminal $P_7$ as the output terminal for the digital signals, the ROM 19 is written with the program such as the control data presetting program which is executed immediately after the system is fed with the power from a power source. As a result, the aforementioned input output port 12 is so controlled by the control data set in the aforementioned register 15 as to transfer the digital output data in the aforementioned register 15 to the aforementioned external terminal $P_7$. From the address decoder 18, there is fed a control signal which is used for setting such digital output data in the aforementioned register 15 as are fed from the circuit 5 to the internal data bus line BUS.

Indicated at numeral 13 is an analog multiplexer which has its input terminal coupled to the corresponding external terminals $P_1$ to $P_5$, respectively, and its output terminal coupled to the input terminal of an A/D converter 14.

The aforementioned A/D converter 14 is fed with such one of the analog input signals fed to the plural external terminals as is selected by the aforementioned analog multiplexor 13.

Such external terminal of the plural external terminals and such selecting timings thereof as are to be selected by the aforementioned analog multiplexer 13 are determined by the control signals which are fed out of a control register 17.

The control signals to be set in the aforementioned control register 17 are fed to the internal data bus line BUS through the data buffer 11 from the aforementioned ROM 19 written with the program, and the control signals for setting the aforementioned control signals in the aforementioned control register 17 are fed out of the aforementioned address decoder 18.

The respective input timings of the aforementioned analog input signals are suitably determined by a program which is written in advance in the ROM 19.

For example, the level of the analog input signals to be fed out of a temperature detecting element such as a thermistor is varied at a relatively slow rate. It is, therefore, sufficient that such analog input signals are selected once for a relatively long period. On the contrary, the analog input data to be fed out of a detecting element such as the tachometer of the engine are selected once for a relatively short period.

The analog input data thus selected by the aforementioned analog multiplexer 13 are converted by the aforementioned A/D converter 14 into digital data signals of several bits.

The digital data signals fed from the aforementioned A/D converter 14 are held in a register 16.

The digital data signals thus held in the aforementioned register 16 are transferred to the aforementioned internal data bus line BUS by the control of the register 17 with the control signals which are fed from the address decoder 18. The digital data signals in the aforementioend internal data bus line BUS are written in the aforementioned RAM 20 through the data buffer 11.

In order to receive the analog input signal fed to one of the external terminals, therefore, the group of the programs both for setting the control signals in the control register 17 and for transferring the digital data signals from the aforementioned register 16 to the internal data bus line BUS at the time of the end of the A/D conversion are executed.

In the embodiment being described, the terminal $P_5$ of the aforementioned common terminals $P_4$ and $P_5$ is fed with the digital signals. Therefore, the signal fed to the aforementioned common terminal $P_5$ is not detected as an analog signal.

As a result, the ROM 19 is not set with the program for transferring the signal, which is fed to the aforementioned common terminal $P_5$, to the internal data bus line BUS through the aforementioned analog multiplexer 13, A/D converter 14 and register 16.

In other words, the ROM 19 is not written with the instruction of setting the control signals, which instruct the aforementioned terminal $P_5$, in the control register 17. The ROM 19 is not written with the instruction of transferring the set data having no special meaning from the aforementioned register 16 to the internal data bus line BUS. In the manner thus far described, the aforementioned A/D converter 14 can be prevented from being unnecessarily operated, and the number of the instructions to be written in the aforementioned ROM 19 can be reduced. Incidentally, the signals at the aforementioned terminal $P_5$ may be unconditionally set in the aforementioned register 16 through the aforementioned analog muliplextor 13 and the aforementioned A/D converter 14. Even in this case, the aforementioned terminal $P_5$ can be prevented from being substantially selected by the fact that the instruction of transferring the data from the aforementioned register 16 to the aforementioned internal data bus line BUS is not written in the ROM 19.

Incidentally, when the aforementioned common terminals $P_4$ and $P_5$ are used as the analog signal input terminal or the digital signal input terminal, the aforementioned input output port 12 is made to exhibit high output impedance characteristics for those terminals P$_4$ and P$_5$. As a result, the analog input signal level or the digital input signal level to be fed to the aforementioned terminals P$_4$ and P$_5$ is prevented from being disturbed by the aforementioned input output port 12.

Figure 2:
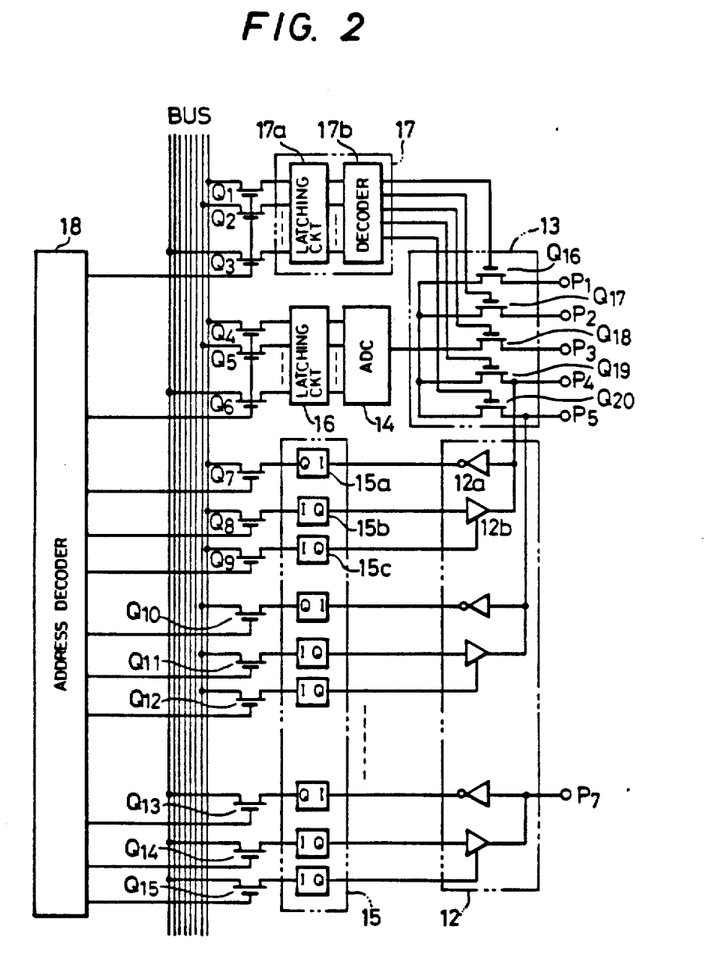
FIG. 2 is a block diagram showing the detailed construction of the circuit blocks of FIG. 1.

The operations and a specific construction of the circuits thus far described will be understood in more detail in view of the following description taken in conjunction with the circuit diagram shown in FIG. 2.

In FIG. 2, the multiplexer 13 is constructed of transfer gate MISFETs Q$_{16}$ to Q$_{20}$ which have their respective gate electrodes coupled to the register 17.

The aforementioned register 17 is constructed of a latching circuit 17a and a decoder circuit 17b. The aforementioned latching circuit 17a has its plural input terminals coupled to the internal data bus line BUS through transfer gate MISFETs Q$_1$ to Q$_3$ and its plural output terminals coupled to the plural input ternials of the aforementioned decoder circuit 17b.

The aforementioned register 17 is set with the signal in the internal data bus line BUS by rendering the MISFET Q$_3$ conductive in response to the output signal of the address decoder 18.

The decoder circuit 17b decodes the signal of the aforementioned latching circuit 17a thereby to generate a signal for selecting such one from the transmission MISFETs Q$_{16}$ to Q$_{20}$ in the multiplexer 13 as corresponds to the signal received by the aforementioned latching circuit 17a.

As a result, the selecting operations of the aforementioned multiplexer 13 are executed such that the address signal instructing the aforementioned latching circuit 17a is fed from the grouped registers 9 to the address decoder 18 and such that the multiplexor selecting data are fed to the internal data bus line BUS.

The register 16 has its plural input terminals coupled to the plural output terminals of the A/D converter 14 and its plural output terminals coupled to the aforementioned internal data bus line BUS through transmission gate MISFETs Q$_4$ to Q$_6$.

The transmission gate MISFETs Q$_4$ to Q$_6$ are rendered conductive when the address signal instructing the aforementioned register 16 is fed from the grouped registers 9 of FIG. 1 to the aforementioned address decoder 18. As a result, the A/D conversion signals, which are fed from the aforementioned A/D converter 14 to the aforementioned register 16, are further fed to the internal data bus line BUS through the aforementioned transmission gate MISFETs Q$_4$ to Q$_6$.

The input output port 12 for receiving and feeding the digital signal is constructed, as shown, of input and output buffer amplifiers 12a and 12b which are to be coupled in a one-to-one relationship to the terminals P$_4$ to P$_7$, respectively.

The aforementioned input buffer amplifier 12a is further constructed of a high input impedance circuit such as an inverter made of a well-known MISFET in order that it may not adversely affect the level of the signal fed from either the output buffer amplifier 12b or the external sensor.

The aforementioned output buffer amplifier 12b is constructed of a well-known tri-state circuit which in turn is made of a MISFET. The gate signal for controlling the operation of the aforementioned output buffer amplifier 12b is fed from the latching circuit 15c in the register 15.

If the output signal of the aforementioned latch circuit 15c is at a high level, for example, the aforementioned output buffer amplifier 12b is rendered operative so that a digital signal at a high or low level is fed from the aforementioned output buffer amplifier 12b to the external terminal P$_4$. If, on the contrary, the output signal of the aforementioned latching circuit 15c is at a low level, the output terminal of the aforementioned output buffer amplifier 12b is rendered to have a high impedance state or a floating state.

The register 15 is constructed of a latching circuit 15a, which is receptive of the output signal fed from the input buffer amplifier 12a of the aforementioned input output port 12, a latching circuit 15b, which is operative to feed the signal to the input terminal of the output buffer amplifier 12b, and the aforementioned latching circuit 15c which is operative to feed the gate input signal to the output buffer amplifier 12b, as has been described in the above.

Although not especially limited, all of the output terminals of the latching circuit 15a, which is provided to correspond to the external terminal P$_4$, the input terminal of the latching circuit 15b, and the input terminal of the latching circuit 15c are commonly coupled, as shown, to the one bit line of the internal data bus line BUS through transmission gate MISFETs Q$_7$, Q$_8$ and Q$_9$, respectively.

Likewise, the input and output terminals of the latching circuits in the register 15, which are provided to correspond to the external terminal P$_5$, are commonly coupled to the other bit line through transmission MISFETs Q$_{10}$, Q$_{11}$ and Q$_{12}$, respectively, whereas the input and output terminals of the latching circuit in the register 15, which are provided to correspond to the external terminal P$_7$, are commonly connected with another bit line through transmission gates MISFETs Q$_{13}$, Q$_{14}$ and Q$_{15}$, respectively.

The aforementioned transmission gates MISFETs Q$_7$ to Q$_{15}$ are fed with the addresses, which are selected by the address decoder 18, respectively.

In accordance with the construction thus far described, the analog input converted into a digital signal, and the digital input are made common by the internal data but line BUS. As a result, the reception of the input signals of the aforementioned two kinds is performed by making different the address instructions of the registers 16 and 15.

In case the common external terminal P$_5$ is used as the digital input terminal, as shown in FIG. 1, the ROM 19 is written with the program containing both the instruction of resetting the latch circuit in the register 15, which corresponds to the transmission gate MISFET Q$_{12}$, and the instruction of feeding the digital signal, which is fed to the external terminal P$_5$, to the internal data bus line BUS through the transmission gate MISFET Q$_{10}$. In this case, incidentally, the aforementioned ROM 19 is neither written with the instruction of selecting the transmission gate MISFET Q$_{11}$ nor the instruction of selecting the MISFET Q$_{20}$ of the multiplexer 13.

Likewise, the aforementioned ROM 19 is written with both the instruction of resetting the latch circuit 15c of the register through the transmission MISFET Q$_9$ and the instruction of selecting the transmission gate Q$_{19}$ of the multiplexer 13 but not with the instruction of selecting the transmission gates Q$_7$ and Q$_8$.

The integrated circuit shown in FIG. 1 is used to control the engine although not limited thereto.

For this purpose, a thermistor $DET_1$ for detecting the temperature of engine cooling water is connected between the external terminal $P_1$ of the microprocessor 1 and the grounded point of the circuit, and a load resistor $R_1$ is connected between that thermistor $DET_1$ and a power source terminal $V_B$. If an element haivng a negative temperature coefficient is used as the aforementioned thermistor $DET_1$, the voltage to be applied to the aforementioned external terminal $P_1$ is decreased with the temperature rise of the engine cooling water.

Likewise, a thermistor $DET_2$ for detecting the sucked air temperature of the engine and a load resistor $R_2$ therefor are connected with the external terminal $P_2$.

A suction flow meter $DET_3$ is connected with the external terminal $P_3$. The suction flow meter $DET_3$ is constructed, for example, of a resistance member and a sliding contact which is shifted with respect to the resistance member in accordance with the suction flow rate. As a result, that suction flow meter feeds the aforementioned external terminal $P_3$ with a voltage according to the suction flow rate.

The tachometer of the engine, as indicated at letters $DET_4$, is connected with the external terminal $P_4$. The tachometer $DET_4$ feeds the aforementioned terminal $P_4$ with a voltage according to the rpm of the engine.

The starter switch SW of the engine is connected with the external terminal $P_5$.

A crank angle sensor of the engine, as indicated at letters $DET_5$, is connected with the external terminal $P_6$. The sensor $DET_5$ is so constructed as to generate such pulse signals as take a high level when the crank shaft comes to a predetermined angular position, e.g., of 0 degrees.

On the other hand, the external terminal $P_7$ is used as an output terminal for warning the engine temperature, for example. The lamp PL is so driven by a buffer circuit 30 which is made receptive of the output of the aforementioned terminal $P_7$ that it is lit when the engine temperature reaches an abnormal level.

The interface circuit 21 is fed with the control signal from the grouped external terminals CONT of the microprocessor 1, the address signal from an address bus AD and the data from the data bus DT. The interface circuit 21 has a plurality of output lines $l_1$ and $l_4$ and contains therein such (not-shown) memory circuits as are respectively selected by the address signals of the address bus AD and as have their states determined by the data signals of the data bus DT.

The signal of the output line $l_1$ of the aforementioned interface circuit 21 is fed through an output buffer circuit 22 to an ignition coil 26, whereas the signal of the output line $l_2$ is fed through an output buffer circuit 23 to a solenoid 27 for adjusting the throttle valve in the suction manifold of the engine. On the other hand, the signal of the output line $l_3$ is fed through an output buffer circuit 24 to an electromagnetic type fuel pump 28, whereas the signal of the output line $l_4$ is fed to a relay 29 for driving the starter of the engine.

In the embodiment being described, in order to control the engine, the ROM 19 is stored with not only the program but also the various interpolation data which are determined by the characteristics of the engine to be controlled.

For example, the angle of ignition advance of the ignition plug is determined by not only the rpm of the engine but also the engine characteristics. Therefore, the ignition timing data for the rpm of the engine have to be set in advance in the ROM 19. In this instance, the data of the engine characteristics for the aforementioned ignition timing data are not set in the ROM in a manner to correspond all the rpms of the engine but are set as such interpolation data in the ROM as correspond only to several rpms of the engine so that the capacity of the ROM can be reduced.

Likewise, the solenoid for controlling the throttle valve is controlled in accordance with the suction temperature, the engine temperature, the rpm of the engine and the engine characteristics. The data of these engine characteristics for controlling the solenoid are set as the interpolation data in the ROM.

The various engine control data when the engine is practically at its operating condition are prepared by the arithmetic operations of the microprocessor 1, which is made receptive of the data fed from the aforementioned various sensors and the various interpolation data written in advance in the aforementioned ROM 19.

Referring to FIG. 1, when a key switch $S_0$ is turned on, the power source voltage is fed from a battery B to a constant voltage circuit 40 so that the power source voltage $V_B$ is fed from that constant voltage circuit 40 to the aforementioned respective circuits.

The analog data such as the the temperature of the engine cooling water or the suction temperature, which are generated by the thermisters $DET_1$, $DET_2$ and the like when the microprocessor 1 becomes operative, are converted in a time-division manner into digital data by the action of the analog to digital converter 14. The respective digital data thus converted are written through the data bus in the random acceess memory (RAM) 20.

The fuel pump 28 is rendered operative by the output from the interface circuit 21.

When the starter switch SW is turned on, the relay 29 is rendered operative so that the starter (although not shown) starts its operation.

In order to reduce the capacity of the ROM 19, the data therein concerning the ignition timing, for example, are made to correspond only to the predetermined rpms sampled.

As a result, the data of the ignition timing from the tachometer $DET_4$ for any rpm of the engine by the arithmetic operation, in which the interpolation data in the ROM 19 for the sampled rpm near any of the aforementioned engine rpms are corrected in view of any engine rpm above-specified.

Thus, the practical ignition timing is calculated from the standard ignition timing based upon the output of the crank angle sensor $DET_5$ and from the ignition timing data determined by the aforementioned arithmetic operations. In accordance with the ignition timing thus calculated, the ignition coil 26 is driven.

The interpolation data of the ROM 19 for controlling the throttle valve in accordance with the rpm data of the engine, the temperature data of the engine cooling water and the suction temperature data are considered so that the pulse control signals for controlling the throttle valve are generated. By these pulse control signals, the duty ratio of the pulse current of the solenoid 27 to be coupled through the interface circuit 21 is changed. The solenoid 27 has its mean current changed by the duty ratio of the pulse current so that the throttle valve is controlled in accordance with the aforementioned duty ratio.

According to the embodiment thus far described, the various process controls of different requirements, in other words, the various process controls having different numbers of analog signal inputs and digital signal inputs and outputs are made possible by a reduced number of terminals so that the general usability of the various process controls of the microprocessor for controlling the automotive engine or the like can be improved. Moreover, the process controls of high quality, i.e., of high density are also made possible merely by changing a portion of the program even for the change in the system from the digital input to the analog input.

The present invention should not be limited to the embodiment thus far described but can be so modified that the port is constructed of such input and output ports as are independent of each other. In this modification, the common use of the terminals is made between the input port and the analog input.

Even in the case of commonly using the terminals, various modifications can be made such that all of the analog inputs are made common or such that all the digital inputs are made common.

Moreover, the system construction of the microprocessor can be modified in various manners.

Figure 3:
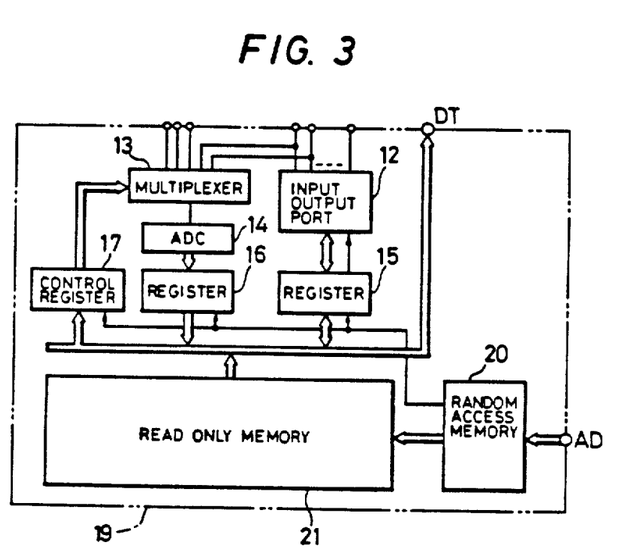
FIG. 3 is a block diagram showing the circuit of another embodiment of the present invention.

Still moreover, the system for effecting the various process controls is constructed, generally speaking, of a digital semiconductor integrated circuit of several chips, which is made of a microprocessor, a ROM (or RAM) written with a control program, and an RAM for holding various data. Therefore, the analog to digital input output circuit containing the aforementioned A/D converter may be provided, for example, as shown in FIG. 3, in the digital semiconductor integrated circuit 19 constructing the ROM written with the control program. More specifically, the digital semiconductor integrated circuit 19, which is constructed of the address decoder 20 and the memory array 21 written with the program instruction, is similarly with the input output port 12, the register 15, the multiplexer 13, the A/D converter 14 and the registers 16 and 17. With this construction, similar operations can be effected by connecting the data and address buses of the digital semiconductor integrated circuit 19 and the microprocessor through the external data and address buses.

Moreover, in the digital control system containing the RAM, the analog to digital input output circuit containing the aforementioned A/D converter may be provided in the digital semiconductor integrated circuit constructing the RAM, and the whole system of the microprocessor, ROM and RAM may be similar constructed of a one-chip digital semiconductor integrated circuit.

What is claimed is:

1. A microprocessor having a register, an internal bus, an arithmetic and logic unit, a plurality of external terminals and a control circuit, said microprocessor comprising:
   a digital signal input circuit having at least one digital signal input node coupled to one or more of said plurality of external terminals and at least one output node;
   an analog signal input circuit having at least one analog signal input node and at least one output node coupled to said internal bus;
   first switching means for transmitting to said analog signal input node an analog signal from at least one of said external terminals coupled to said digital signal input circuit; and
   second switching means for selectively coupling said output node of said digital signal input circuit to said internal bus.

2. A microprocessor according to claim 1 wherein said analog signal input circuit comprises a converter for converting an analog signal on said analog signal input node to a digital signal.

3. A microprocessor according to claim 2 wherein said analog signal input circuit further comprises a register to be coupled to an output node of said converter.

4. A microprocessor according to claims 2 or 3 wherein said digital signal input circuit includes a register coupled to said second switching means.

5. In a digital control system having a controllable device having its operation controlled by digital control signals and a microprocessor receptive of both an analog signal and a digital signal for generating said digital control signals, the improvement comprising:
   a microprocessor having a register, an internal bus, an arithmetic and logic unit, a control circuit and a plurality of external terminals;
   a digital signal input circuit having at least one digital signal input node coupled to one or more of said plurality of external terminals and at least one output node;
   an analog signal input circuit having at least one analog signal input node coupled to one or more of said plurality of external terminals and at least one output node;
   at least one of said external terminals being coupled commonly with the analog signal input node of said analog signal input circuit and the digital signal input node of said digital signal input circuit;
   first switching means for coupling the output node of said digital signal input circuit to said internal bus;
   second switching means for coupling the output node of said analog signal input circuit to said internal bus; and
   wherein each of said first and second switching means does not couple output nodes of said digital and said analog signal input circuits to said internal bus at the same time.

6. A digital control system according to claim 5 wherein said analog signal input circuit comprises a converter for converting an analog signal over said analog signal input node to digital signal.

7. In a microprocessor having a register, an internal bus, an arithmetic and logic unit, a control circuit and a plurality of external terminals, said microprocessor comprising:
   a digital signal input circuit having at least one digital signal input node coupled to one or more of said plurality of external terminals and at least one output node;
   an analog signal input circuit having at least one analog signal input node coupled to one or more of said plurality of external terminals and at least one output node;
   at least one of said external terminals being coupled commonly with the analog signal input node of said analog signal input circuit and the digital signal input node of said digital signal input circuit;
   first switching means for coupling the output node of said digital signal input circuit to said internal bus;
   second switching means for coupling the output node of said analog signal input circuit to said internal bus; and
   wherein each of said first and second switching means does not couple output nodes of said digital and said analog signal input circuits to said internal bus at the same time.

8. A microprocessor according to claim 7 wherein said analog signal input circuit comprises a converter for converting an analog signal over said analog signal input node to a digital signal.

9. A microprocessor according to claim 8 wherein said analog signal input circuit has a plurality of analog signal input nodes, and an analog multiplexer for transmitting one of analog input signals to be fed to said at least one analog signal input node to said converter.

10. A microprocessor acocrding to claim 9 wherein said analog input circuit comprises a register to be coupled to an output node of said converter.

11. A microprocessor according to claims 8, 9 or 10 wherein said digital input circuit includes a register coupled to said first switching means.

12. In a microprocessor having a register, an internal bus, an arithmetic and logic unit, a control unit and a plurality of external terminals, said microprocessor comprising:
- a digital signal input output circuit having at least one digital signal input output node coupled to one or more of said plurality of external terminals and at least one output node;
- an analog signal input circuit having at least one analog signal input node coupled to one or more of said plurality of external terminals and at least one output node;
- at least one of said external terminals being coupled commonly with the analog signal input node of said analog signal input circuit and the digital signal input output node of said digital signal input output circuit;
- first switching means for coupling the output node of said digital signal input output circuit to said internal bus;
- second switching means for coupling the output node of said analog signal input circuit to said internal bus; and
- wherein each of said first and second switching means does not couple output nodes of said digital signal input output circuit and said analog signal input circuits to said internal bus at the same time.

13. A microprocessor according to claim 12 wherein said analog signal input circuit comprises a converter for converting an analog signal over said analog signal input node to a digital signal.

14. A microprocessor according to claim 13 wherein said analog signal input circuit has a plurality of analog signal input nodes, and an analog multiplexer for transmitting one of analog input signals to be fed to said analog signal input nodes of said converter.

15. A microprocessor according to claim 14 wherein said analog input circuit comprises a register to be coupled to an output node of said converter.

16. A microprocessor according to claims 13, 14 or 15 wherein said digital input output circuit includes a register coupled to said first switching means.

17. In a digital control system having a controllable device having its operation controlled by digital control signals; and a microprocessor receptive of both an analog signal and a digital signal for generating said digital control signals, the improvement comprising:
- a microprocessor having a register, an internal bus, an arithmetic and logic unit, a control circuit and a plurality of external terminals;
- a digital signal input output circuit having at least one digital signal input output node coupled to one or more of said plurality of external terminals and at least one output node;
- an analog signal input circuit having at least one analog signal input node coupled to one or more of said plurality of external terminals and at least one output node;
- at least one of said external terminals being coupled commonly with the analog signal input node of said analog signal input circuit and the digital signal input output node of said digital signal input output circuit;
- first switching means for coupling the output node of said digital signal input output circuit to said internal bus;
- second switching means for coupling the output node of said analog signal input circuit to said internal bus; and
- wherein each of said first and second switching means does not couple output nodes of said digital signal input output circuit and said analog signal input circuits to said internal bus at the same time.

18. A digital control system according to claim 17 wherein said analog signal input circuit comprises a converter for converting an analog signal over said analog signal input node to digital signal.

19. A microprocessor having a register, an internal bus, an arithmetic and logic unit, a plurality of external terminals and control means, said microprocessor comprising:
- a digital signal input circuit having at least one digital signal input node coupled to one or more of said plurality of external terminals;
- an analog signal input circuit having at least one analog signal input node coupled to one or more of said plurality of external terminals;
- at least one of said external terminals being coupled in common to said analog and said digital signal input circuits;
- said digital signal input circuit having first switching means for selectively coupling said digital signal input node to said internal bus;
- said analog signal input circuit having second switching means for selectively coupling said analog signal input node to said internal bus; and
- the switching states of said first and second switching means being controlled by said control means.

20. A microprocessor according to claim 19 wherein said analog signal input circuit comprises a converter for converting an analog signal over said analog signal input node to a digital signal.

21. A microprocessor according to claim 20 wherein said analog signal input circuit has a plurality of analog signal input nodes, and an analog multiplexer for transmitting one of analog input signals to be fed to said analog signal input nodes to said converter.

22. A microprocessor according to claim 21 wherein said analog signal input circuit comprises a register to be coupled to an output node of said converter.

23. In a digital control system having a controllable device having its operation controlled by digital control signals and a microprocessor receptive of both an analog signal and a digital signal for generating said digital control signals, the improvement comprising:
- a microprocessor having a register, an internal bus, an arithmetic and logic unit, control means and a plurality of external terminals;

a digital signal input circuit having at least one digital signal node coupled to one or more of said plurality of external terminals;

an analog signal input circuit having at least one analog signal input node coupled to one or more of said plurality of external terminals;

at least one of said external terminals being coupled in common to said analog and said digital signal input circuits;

said digital signal input circuit has first switching means for selectively coupling said digital signal input node to said internal bus;

said analog signal input circuit has second switching means for selectively coupling said analog signal input node to said internal bus; and the switching states of said first and second switching means being controlled by said control means.

24. A digital control system according to claim 23 wherein said analog signal input circuits comprises a converter for converting an analog signal over said analog signal input node to digital signal.

25. A microprocessor according to claim 24 wherein said analog signal input circuit has a plurality of analog signal input nodes, and an analog multiplexer for transmitting one of analog input signals to be fed to said analog signal input nodes to said converter.

26. A microprocessor according to claim 25 wherein said analog input circuit comprises a register to be coupled to an output node of said converter.

* * * * *

Disclaimer 4,736,337.—*Shirou Baba*, Tachikawa, Japan. MONOLITHIC INTEGRATED CIRCUIT HAVING COMMON EXTERNAL TERMINAL FOR ANALOG AND DIGITAL SIGNALS AND DIGITAL SYSTEM USING THE SAME. Patent dated Apr. 5, 1988. Disclaimer filed Feb. 22, 1989, by the assignee, Hitachi, Ltd.

The term of this patent subsequent to May 29, 2001, has been disclaimed.
[*Official Gazette May 2, 1989*]